United States Patent [19]

Nelson

[11] 4,353,357

[45] Oct. 12, 1982

[54] SOLAR COLLECTOR

[76] Inventor: H. Lee Nelson, 150 Clarence Rd., Scarsdale, N.Y. 10583

[21] Appl. No.: 203,435

[22] Filed: Nov. 3, 1980

[51] Int. Cl.³ ............................................... F24J 3/02
[52] U.S. Cl. ................................... 126/450; 126/441; 126/446; 126/445
[58] Field of Search .............................. 126/429-431, 126/441, DIG. 2, 445, 446, 448, 449, 450, 901

[56] References Cited

U.S. PATENT DOCUMENTS

| | | | |
|---|---|---|---|
| 3,894,685 | 7/1975 | Keyes et al. | 126/422 |
| 3,991,938 | 11/1976 | Ramey | 126/432 |
| 3,996,918 | 12/1976 | Quick | 126/932 |
| 4,038,965 | 8/1977 | Lyon | 126/446 |
| 4,073,283 | 2/1978 | Lof | 126/432 |
| 4,111,188 | 9/1978 | Murphy, Jr. | 126/450 |
| 4,129,117 | 12/1978 | Harvey | 126/432 |
| 4,130,108 | 12/1978 | Patil | 126/441 |
| 4,132,217 | 1/1979 | Rom et al. | 126/449 |
| 4,144,871 | 3/1979 | Porter | 126/449 |
| 4,153,037 | 5/1979 | Isaacson | 126/449 |
| 4,178,912 | 12/1979 | Felter | 126/431 |
| 4,180,055 | 12/1979 | Hudnall | 126/440 |
| 4,278,071 | 7/1981 | Brill-Edwards | 126/DIG. 2 |
| 4,296,741 | 10/1981 | Harder | 126/449 |

FOREIGN PATENT DOCUMENTS

| | | |
|---|---|---|
| 2721343 | 11/1978 | Fed. Rep. of Germany ... 126/DIG. 2 |
| 2722206 | 11/1978 | Fed. Rep. of Germany ... 126/DIG. 2 |
| 2729313 | 1/1979 | Fed. Rep. of Germany ... 126/DIG. 2 |
| 2366525 | 7/1976 | France ............................... 126/432 |
| 52-47706 | 6/1977 | Japan .................................. 126/449 |

OTHER PUBLICATIONS

"Civil Engineering-ASCE," Feb., 1980, pp. 38–46.
"NESEC-Update," Mar., 1980, p. 2.

*Primary Examiner*—James C. Yeung
*Attorney, Agent, or Firm*—Eric Y. Munson

[57] ABSTRACT

A solar collector module includes a first pan shaped absorber, a smaller second pan shaped absorber adapted to be received in the first absorber, and a first plurality of heat exchanger fins affixed to the bottom of the second pan for defining a baffled, mazelike fluid flow path between the first and second absorber pans. A fluid inlet is provided at one end of the fluid flow path, while a fluid outlet is provided at the other end of the fluid flow path. A second plurality of heat exchanger fins extends upwardly from the second absorber pan, and a first insulative dead air space is defined between the second pan and a first transparent cover supported atop the upwardly extending fins. A transparent grid mounted atop the first transparent cover supports a second transparent top cover, defining a second insulative dead air space between the first and second covers.

12 Claims, 8 Drawing Figures

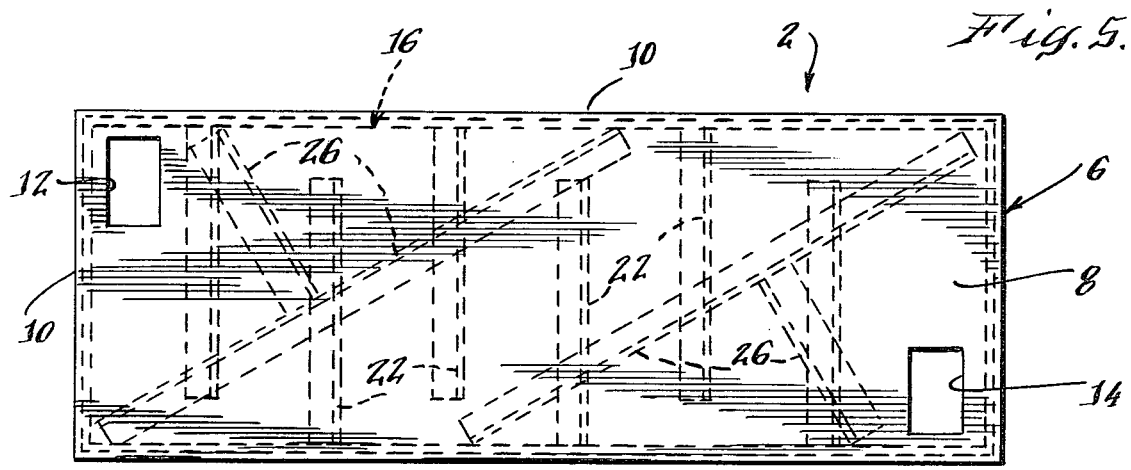
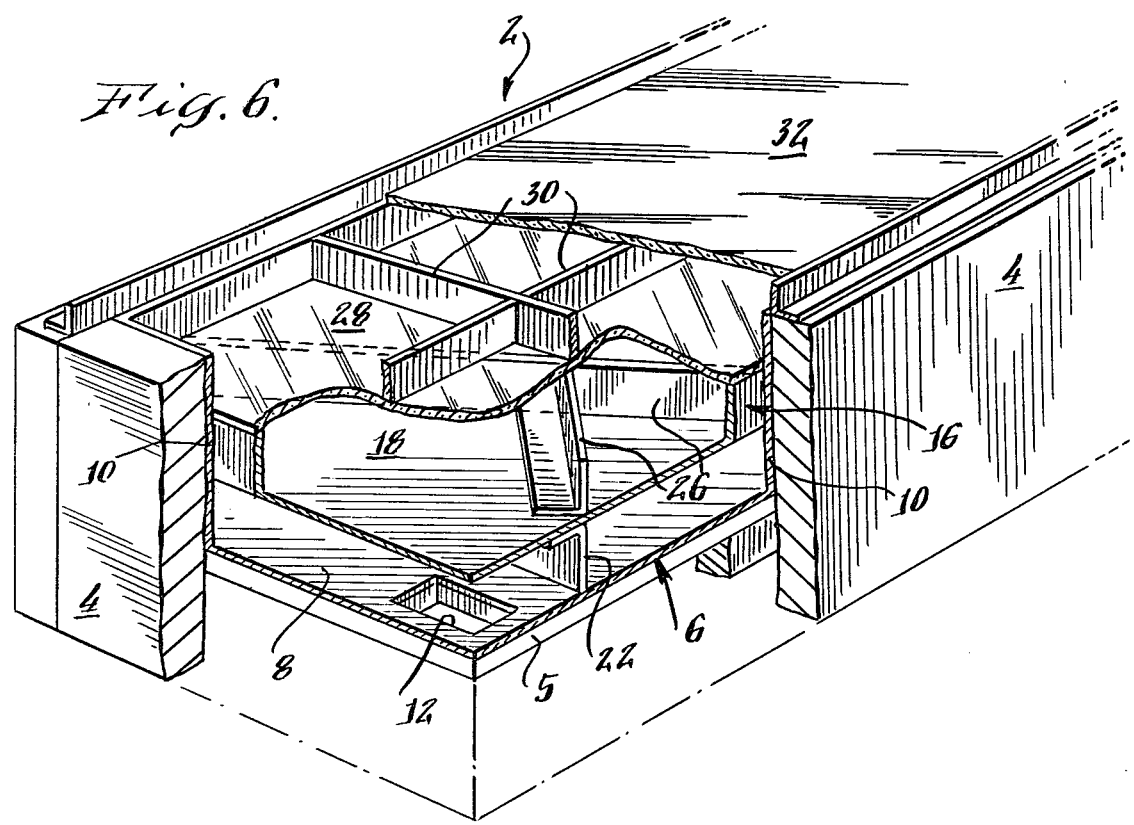

4,353,357

SOLAR COLLECTOR

BACKGROUND OF THE INVENTION (A) Field of the Invention

The present invention relates to solar collector modules, and more specifically discloses an improved solar collector module which is easy and economical to manufacture and assemble and which provides improved absorption and insulative characteristics. The individual modules can be interconnected to form a complete roof structure.

(B) Discussion of the Prior Art

As the cost of heating fuel soars, less expensive sources of energy are in demand. This accounts for the popularity of solar collectors. Typical solar collectors include solar absorber plates formed from or coated with an absorber material, such as a blackened metal, which is capable of absorbing solar radiation and emitting infra-red (heat wave) radiation. A fluid medium, typically air or water, is caused to contact the absorber plate, and heat from the absorber plate is transferred to the fluid medium. Storage chambers are provided for storing the heat transmitted by the fluid until its use is desired.

Solar collectors known to the art are exemplified by U.S. Pat. No. 3,894,685, issued to Keyes et al; U.S. Pat. No. 4,130,108, issued to Patil; U.S. Pat. No. 4,129,117, issued to Harvey; and U.S. Pat. No. 4,180,055, issued to Hudnall. These patents illustrate solar collectors capable of using liquids, gases, or both, as a heat transfer medium. Each includes an absorber member and fluid inlet and outlet means and a flow path for the heat absorbing fluid medium through or around the absorber member. U.S. Pat. No. 3,894,685 (FIG. 15) and U.S. Pat. No. 4,144,871 (FIG. 4) disclose baffles for increasing the length of the fluid flow path through the absorber, and U.S. Pat. No. 4,130,108 discloses means for passing air across both the top and bottom of an absorber plate for increasing the time which the fluid medium is in contact with the absorber. U.S. Pat. Nos. 4,130,108; 4,144,871; 4,132,217; and 4,180,055, among others illustrate insulative dead air spaces formed in solar collectors, and U.S. Pat. No. 4,180,055 further illustrates the use of an absorbing collar having radial absorber fins mounted around a fluid flow pipe to increase the surface area of absorbing material.

U.S. Pat. No. 4,178,912, issued to Felter; U.S. Pat. No. 4,111,188, issued to Murphy, Jr.; U.S. Pat. No. 3,991,938, issued to Ramey; and U.S. Pat. No. 4,153,037, issued to Isaacson, illustrate solar collectors which form either complete or partial roof structures. The aforementioned U.S. Pat. No. 4,132,217 also discloses that individual collectors can be connected on a roof structure. U.S. Pat. No. 3,996,918 illustrates a system of interconnected individual solar collector modules.

Those patents are more fully discussed in a document entitled "Disclosure Statement" filed concurrently herewith.

OBJECT OF THE INVENTION

It is an object of the present invention to provide a solar collector module neither taught nor suggested by the aforementioned patents, which is easy and economical to manufacture and is designed to provide optimum absorption surface area exposed to solar radiation, and improved insulative characteristics. The individual modules are adapted to be interconnected to form a complete roof structure and advantageously utilize the natural upward flow of heating air when air is used as the heat transfer medium.

SUMMARY OF THE INVENTION

A solar collector module includes a first pan-shaped absorber and a second smaller pan-shaped absorber adapted to be received within the first absorber pan. A first plurality of fins arranged in a maze-like pattern are mounted to and extend downwardly from the bottom surface of the second pan, and a second plurality of fins are mounted to and extend upwardly from the top surface of the second absorber pan. The downwardly extending fins define a relatively long maze-like substantially horizontal fluid flow path interposed between the first and second absorber pans, and inlet and outlet ports are provided to introduce a fluid medium into the fluid flow path and discharge it therefrom after heat from the absorber plate is transferred to it. Because the collector module is formed from two pan-shaped absorbers, and the first and second pluralities of fins extending from the second absorber pan are also formed from absorber material, the collector module provides a relatively large absorber surface area.

A first light-transmissive cover is mounted above the second absorber pan and supported by the second plurality of fins extending upwardly from the second absorber pan to define a first insulative dead air space between the second absorber pan and the first cover. The second plurality of heat exchanger fins, which are disposed within the first insulative dead air space, serve both to increase the absorber surface area of the collector module, and also to enhance the insulative effect of the first dead air space by impeding any air movement or turbulence within the first space.

A light-transmissive grid can be placed upon the first cover, and a second light-transmissive cover can be supported on the grid to define a second insulative dead air space between the first and second covers. The transparent grid within the second dead air space serves to enhance the insulative effect of the second air space by impeding any air movement or turbulence therein, but, because the grid is transparent, will not prevent solar energy from passing through it to the absorber pans and absorber fins therebelow.

A plurality of the above-described solar collector modules can be interconnected in shingle fashion to form a complete roof structure. When air is used as the heat transfer medium, means are provided to introduce cooler air at the eaves of the roof and collect the heated air at the peak of the roof, so as to advantageously utilize the natural upward flow of heated air through the individual collector modules.

BRIEF DESCRIPTION OF THE DRAWINGS

FIG. 5 is a bottom plan view of the solar collector, omitting the frame and illustrating a fluid inlet and a fluid outlet defined on an absorber.

FIG. 6 is a perspective view of the solar collector of FIG. 1, partially cut out.

DESCRIPTION OF THE PREFERRED EMBODIMENT

Figure 1:
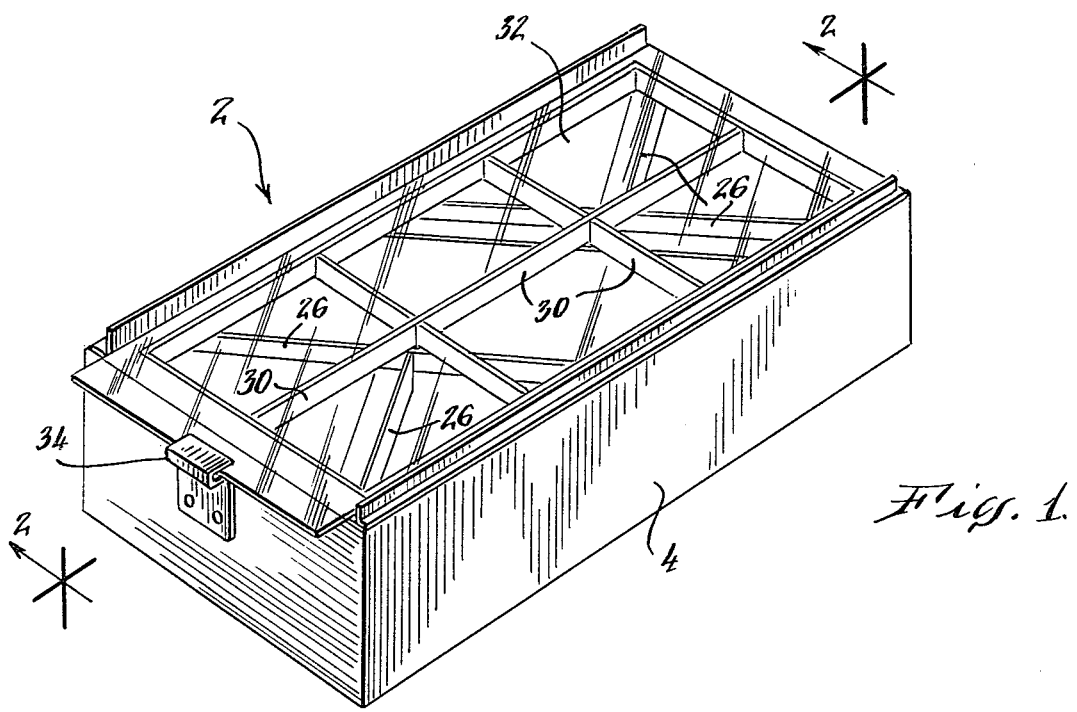
FIG. 1 illustrates a perspective view of a solar collector module in accordance with an embodiment of the present invention.
Figure 2:
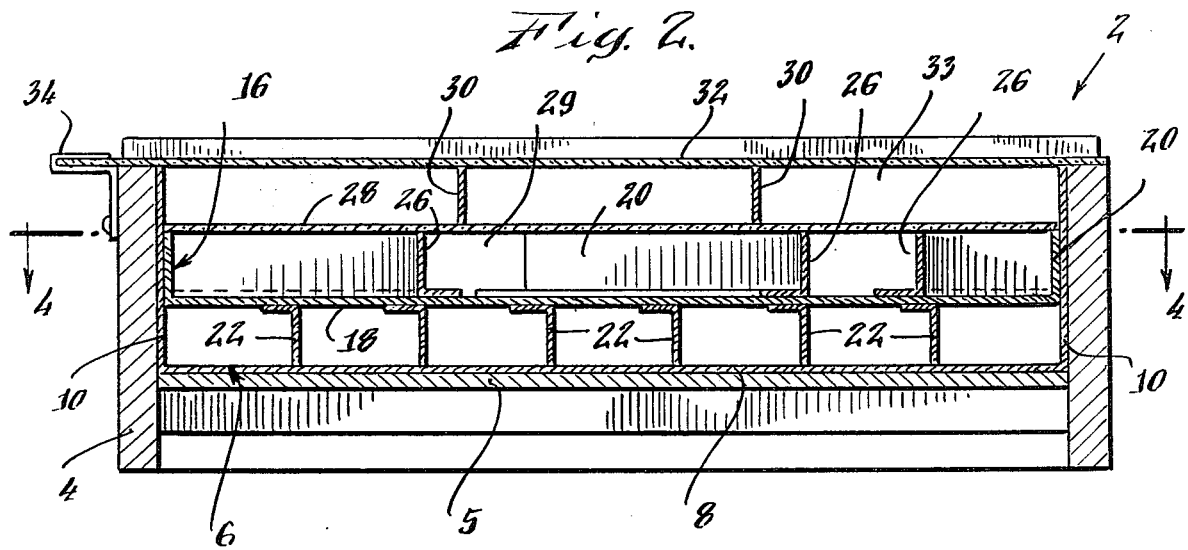
FIG. 2 illustrates a side elevational sectional view of the solar collector module taken along directional arrows 2—2 of FIG. 1.
Figure 3:
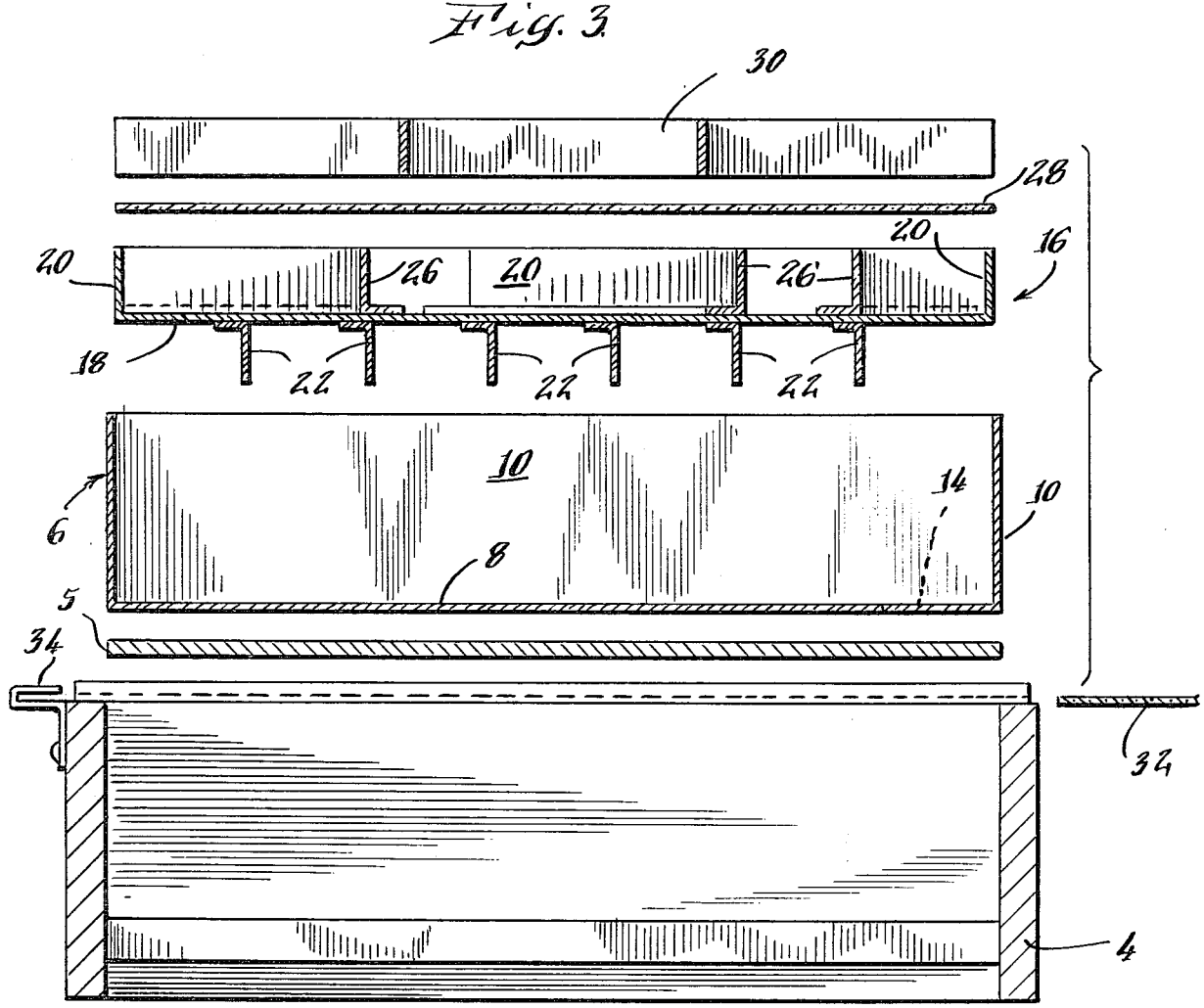
FIG. 3 illustrates a side elevational sectional view of the solar collector module of FIG. 1 in non-assembled, exploded form.

The present invention will now be discussed in detail with reference to FIGS. 1-8 of the drawings. Referring first to FIGS. 1-6, an individual solar collector module in accordance with the preferred embodiment of the present invention is illustrated. The collector module, referred to generally by the reference numeral 2, includes a conventional frame structure 4 which can be formed of wood and defines generally the periphery of the module. An insulating plate 5, preferably made of asbestos cement, is mounted within the frame towards its bottom to provide a supporting insulative base for the collector module. A first pan-shaped solar absorber 6, formed from or coated with an absorber material such as black iron, is positioned above the plate 5 within the frame 4. The pan-shaped absorber 6 has a flat tray portion 8 and a peripheral sidewall 10, both of which are formed from the aforementioned absorbing material. As best shown in FIG. 5, a fluid inlet opening 12 and a fluid outlet opening 14 are defined at opposite ends of the tray portion 8 of the absorber pan 6.

A second pan-shaped absorber 16, which is configured similar to the first absorber but is smaller and shallower, includes a flat tray portion 18 and a peripheral sidewall 20. Absorber pan 16, like absorber pan 6, is formed or coated with a material which absorbs solar energy and becomes heated, as for example, black iron. A first plurality of fins 22, also formed from an absorber material, extend transversely downwardly from the lower surface of the tray portion 18 of absorber pan 16, and a second plurality of fins 26, formed from or coated with absorber material such as black iron, extend upwardly from the upper surface of tray portion 18 of absorber pan 16. The fins 22 and 26 can be mounted to the respective surfaces of tray portion 18, as for example, by spot welding, in advance of assembly of the collector module, so that the module can be assembled efficiently and economically when desired.

Figure 4:
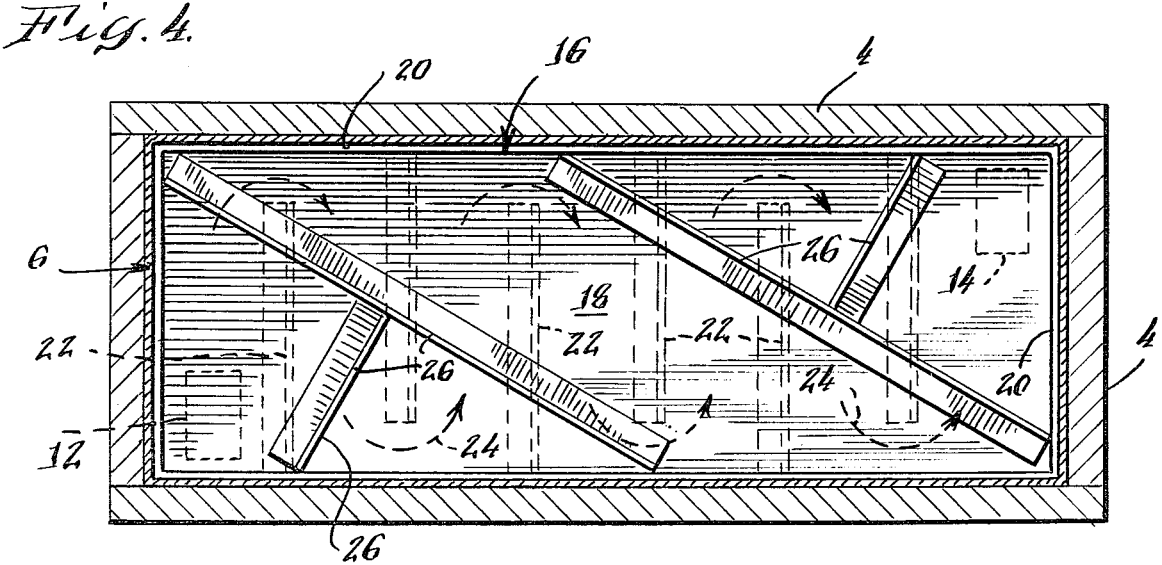
FIG. 4 illustrates a plan view of the solar collector taken along directional arrows 4—4 of FIG. 2 showing the maze-like fluid flow path through the module.

The smaller absorber pan 16 is received within the larger absorber pan 6, and their respective tray portions 8 and 18 are parallel, but spaced apart from each other by a predetermined distance corresponding to the height of the fins 22. The fins 22 are arranged to form a maze-like fluid flow path 24, as best shown in FIG. 4, between the upper surface of tray portion 8 of absorber 6 and the lower surface of tray portion 18 of absorber 16. One end of the fluid flow path 24 communicates with the fluid inlet opening 12, while the other end of the fluid flow path communicates with fluid outlet opening 14. The spacing between each of the consecutive parallel fins 22 increases in a direction towards the outlet opening, and the maze-like fluid flow path 24 provides an elongated and turbulent substantially horizontal path of travel for fluid flowing between the inlet and outlet openings. Because the fluid flow path 24 is defined in its entirety by solar absorbing material (the fins 22 and the tray portions 8 and 18), the elongated flow path increases the time of exposure of the fluid medium to absorber surface area, thereby increasing the quantity of heat transferred to the fluid.

It is appropriate to note at this point in the description that the solar collector module, as thus far described, provides a relatively large absorber surface area which includes the two pan-shaped absorbers 6 and 16 and the two sets of fins 22 and 26. Furthermore, as illustrated above, the fins 22 which are in intimate contact with the absorber surface area of the tray portions 18 and 8, define the long sinuous fluid flow path 24 for increasing the time of exposure of the fluid medium to the absorber material and serve to enhance the heat transfer to the fluid.

Returning to the discussion of FIGS. 1-6, a first transparent flat cover 28, which may be formed from glass or plexiglass, is mounted above the absorber pan 16 and supported thereon by the fins 26 and the top of the peripheral sidewall 20 of absorber pan 16. An insulative first dead air space 29, defined between the upper surface of the tray portion 18 and the lower surface of the transparent cover 28, serves to retain the heat of the absorber surfaces within the collector module. The upwardly-extending fins 26 are located within the insulative space 29 and serve to subdivide the space into a plurality of pockets to impede air turbulence within that space to thereby enhance its insulative effect. Because cover 28 is transparent, it will not obstruct solar energy passing therethrough towards the absorber surfaces therebelow.

It is appropriate to emphasize at this point that the fins 26, like fins 22, serve a dual purpose. That is, in addition to increasing the absorber surface area provided by the collector module, the fins 26 also serve to impede air turbulence within insulative space 29, as discussed above, to enhance its insulative effect.

Although not essential to the operation of the collector module, a second insulative dead air space 33 may be provided above the first space 29, as follows. A transparent grid 30 is supported on the top surface of the first transparent cover 28, and a second transparent flat cover 32 is supported by the top of the transparent grid 30 and the top of the collector frame 4. The second insulative dead air space 33 is defined between the top surface of cover 28 and the bottom surface of cover 32. The grid 30, which is disposed within the second space 33, subdivides that space into a plurality of pockets to impede air turbulence therein and thus enhance the insulative effect of the space. Because cover 32 and grid 30 are transparent, they will not obstruct solar energy passing therethrough towards the absorber surface area located below.

Figure 7:
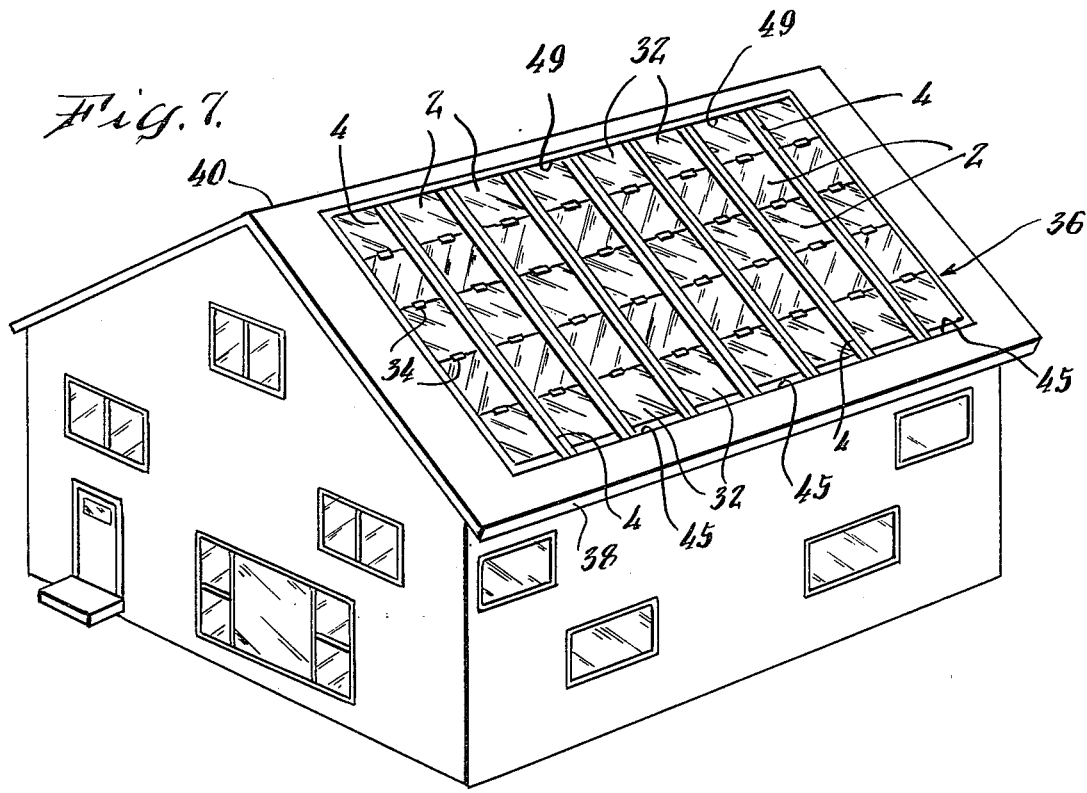
FIG. 7 is a perspective view of a roof structure formed from a plurality of solar collector modules of the type illustrated by FIGS. 1-6.
Figure 8:
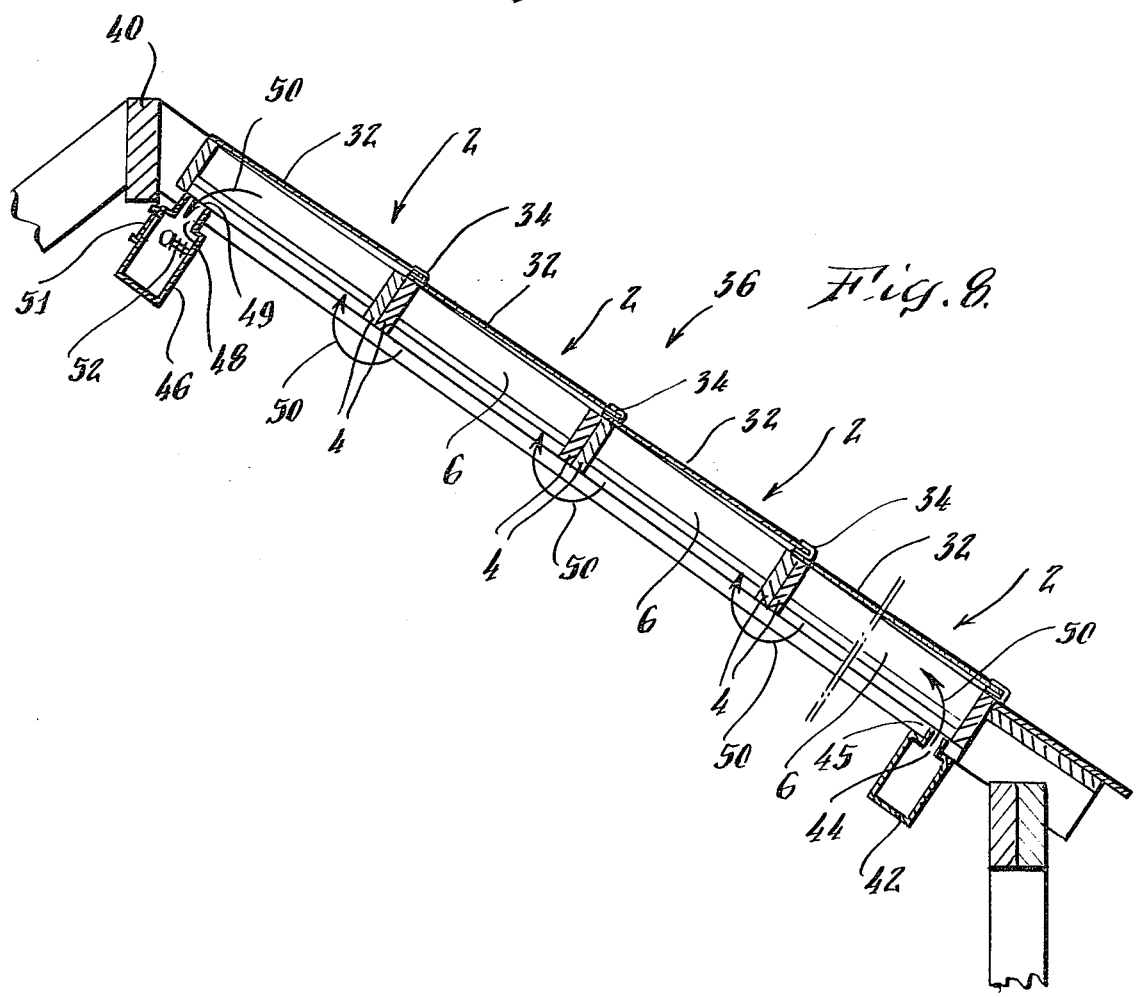
FIG. 8 is a sectional view of a plurality of solar collector modules interconnected in shingle fashion to form the roof structure illustrated by FIG. 7.

As will be more fully discussed with respect to FIGS. 7 and 8, the cover 32 can extend beyond one end of the frame 4 to provide a shingle-like appearance when a plurality of modules are interconnected to form a roof structure. A hold-down clip 34, affixed to the top of the roof frame structure 4, is useful for retaining one end of the cover 32 in an extended position relative to the frame. Additionally, because the cover 32 will be the finished roof surface if the modules are interconnected to form a roof, cover 32 should be formed from a durable weather-resistant material such as plexiglass or tempered glass.

In operation of the above-described solar collector module, conventional means such as a fan (not shown)

are provided to introduce a fluid medium into the fluid inlet opening 12 on the absorber pan 6 and cause it to flow through the fluid flow path 24 and out of the collector through the outlet opening 14 on the absorber pan 6. It is preferred that the fluid medium used with the collector module be gaseous (preferably air) as opposed to water or other liquids. Use of air avoids the problems of freezing, leaking and contamination which may occur in a liquid system. Furthermore, as will be further discussed with respect to FIGS. 7 and 8, a roof structure formed from interconnected collector modules can advantageously utilize the natural upward flow of air as it is continually heated by adjacent collectors on the roof.

Returning to the discussion of the operation of the module as the fluid medium travels through the maze-like fluid flow path 24, it is exposed to the heated absorber surfaces of the absorber fins 22 and the absorber tray portions 8 and 18 of the absorber pans 6 and 16. The fluid medium is exposed to heated absorber surfaces on all sides during its flow through the path 24, and, because the fluid is at a lower temperature than the absorber surfaces, heat will be continually transferred from those surfaces to the fluid. The winding maze-like arrangement of path 24 causes fluid turbulence to enhance the heat transfer operation. Furthermore, the maze-like arrangement increases the length of the fluid flow path to thereby increase the time of exposure of the fluid medium to the absorber surfaces to increase the quantity of heat transferred to the fluid.

The first and second dead air insulating spaces 29 and 33 provide insulation to retain the heat of the absorber surfaces within the collector, but are formed from transparent components and do not obstruct solar energy from passing therethrough to the absorber surfaces. The absorber fins 26 in the insulative space 29 and the transparent grid 30 in the insulative space 33 enhance the insulative qualities of the respective spaces by impeding air turbulence therein.

It is evident that the above-discussed solar collector module embodies several advantageous features not recognized by the background patents discussed previously herein. For example, the use of two pan-shaped absorbers and two sets of heat exchanger fins provide the collector with a relatively large absorber surface area. In addition to providing increased absorber area, one set of fins also serves to increase the flow path of fluid within the collector and cause turbulence to enhance the quantity of heat transferred from the absorber surfaces to the fluid. Likewise, the other set of exchanger fins, in addition to increasing the available absorber surface area, also performs a second function of impeding air turbulence within an insulative dead air space to enhance the insulative characteristics of the collector. Although not essential to the basic invention, a second insulative dead air space can be provided above the first space, and means within that second space act to impede air turbulence therein. The collector module can be assembled economically and efficiently in a relatively short time, because the various components comprising the module are readily stacked upon each other within a peripheral frame structure.

FIGS. 7 and 8 of the drawings illustrate a shingled roof structure generally referred to by 36, formed from a plurality of the above-discussed solar collector modules interconnected to each other in overlapping relationship. The rectangular collector modules 2 are laid end to end in adjacent columns extending between the eaves 38 and the peak 40 of the roof. The individual modules are mounted to a tee extending from the rafters, and the top covers 32 of the individual modules overlay the adjacent end of the next lower module in its respective column to form shingles. A sealant is used to make the roof watertight. The fluid outlet openings of the individual modules communicate with the fluid inlet opening of the adjacent upper module in their respective columns. The general concept of forming a roof from interconnected collector modules is known to the art and illustrated, for example, by U.S. Pat. No. 4,153,037.

The interconnected columns of modules each define a fluid flow passageway from the eaves to the peak of the roof through each of the respective columns. A flow control designed main inlet trunk 42 extends along the eaves of the roof and has openings 44 thereon corresponding to a plurality of inlet bays 45 defined in the roof near the eaves. A flow control designed main outlet collection trunk 46 extends along the peak of the roof and has openings 48 corresponding to outlet bays 49 defined in the roof near the peak. Relatively cooler air is drawn through the inlet trunk 42 (by a conventional fan system, not shown), into the inlet bays 45 and through the individual columns of collectors, into the outlet bays 49, and through the outlet trunk 46 to a storage area (not shown). Arrows 50 of FIG. 8 illustrate the above described flow path. When air is used as the fluid medium, the natural upward flow of heated air assists the fan system in providing the aforementioned flow path through the roof.

On a bright day, it is possible for the temperature in the collectors to reach 400° F., in the event air flow should be interrupted. As long as cooler air is continually circulating through the collectors to remove heat therefrom, the potentially relatively high collector temperature will not develop and present any problem. However, a problem might arise if the forced circulation system (e.g., fan) failed to operate. To avoid such a problem, the present embodiment of the invention provides for a heat resistant covering of the wood roof framing and includes adequate fragile areas and fusible link breakers 52 of conventional construction in the back wall of the main outlet collection trunk. These fusible link breakers cause glass panels in the outlet trunk to break when the temperature within the collectors exceeds a predetermined value corresponding to the failure of the forced circulation system. The broken glass panels provide exit ports for the naturally rising heated air, so that the heated air is removed from the roof to maintain a safe temperature thereon. A conventional alarm (not shown) is coupled to the system to provide a signal if the above-discussed condition occurs.

The description of the embodiment of the invention provided herein is intended to be illustrative only, and not restrictive of the scope of the invention, that scope being defined by the following claims and all equivalents thereto.

I claim:

1. In a solar collector module of the type adapted to absorb solar energy and transfer heat energy to a fluid medium flowing therethrough, the improvement comprising:
    a first pan-shaped solar energy absorber,
    a second pan-shaped solar energy absorber received on the top surface of said first pan-shaped absorber, a first plurality of downwardly-extending heat exchanger fins mounted to the bottom surface of said second pan-shaped absorber and arranged thereon to define a sinuous fluid flow path between the top surface of said first pan-shaped absorber and the bottom surface of said second pan-shaped absorber, one portion of said fluid flow path communicating with a fluid inlet and another portion of said fluid flow path communicating with a fluid outlet, a second plurality of upwardly-extending heat exchanger fins mounted to the top surface of said second pan-shaped absorber, and a first light-transmissive cover mounted above and supported thereon by said second plurality of upwardly-extending fins to define a first insulative dead air space between the top surface of said second pan-shaped absorber and said first cover, said second plurality of upwardly-extending fins being located within said first insulative dead air space, whereby said first and second pan-shaped absorbers and said first and second plurality of fins provide increased absorber area, and said second plurality of fins in said first insulative dead air space impede air movement and turbulence to enhance the insulative effect of said first insulative dead air space.

2. A solar collector module as claimed in claim 1, further including:

a light-transmissive grid mounted on the top surface of said first light-transmissive cover, and a second light-transmissive cover mounted on said light-transmissive grid for defining a second insulative dead air space between said first and second light-transmissive covers, said light-transmissive grid being located within said second insulative dead air space, whereby said light-transmissive grid in said second insulative dead air space impedes air movement and turbulance to enhance the insulative effect of said second insulative dead air space.

3. A solar collector as claimed in claim 1, wherein said fluid inlet is an opening defined in said first pan-shaped absorber.

4. A solar collector as claimed in claim 1, wherein said fluid outlet is an opening defined in said first pan-shaped absorber.

5. A solar collector as claimed in claim 1, wherein said fluid inlet and said fluid outlet are defined at the opposite ends of said fluid flow path.

6. A solar collector as claimed in claim 1, wherein said fluid medium is air.

7. A solar collector as claimed in claim 2, wherein said first and second light-transmissive covers are glass.

8. A solar collector as claimed in claim 1, wherein said first and second pan-shaped absorbers are formed form black iron.

9. A solar collector as claimed in claim 1, wherein said first and second plurality of absorber fins are formed from black iron.

10. A solar collector module as claimed in claim 1, wherein each of said first plurality of fins is of equal height so that the respective flat portions of said first and second pan-shaped absorbers are mounted in substantially parallel planes so that fluid flow through said fluid flow path is in a substantially horizontal plane that is parallel to the planes of the flat portions of said first and second pan-shaped absorbers.

11. In a roof structure of the type formed from a plurality of interconnected adjacent solar collector modules, means for introducing a fluid heat transfer medium to the eaves of said roof, and means for removing said fluid medium from the peak of said roof after it has passed upwardly through said plurality of solar collector modules, the improvement comprising each of said solar collector modules including:

a first pan-shaped solar energy absorber, a second pan-shaped solar energy absorber received on the top surface of said first pan-shaped absorber, a first plurality of downwardly-extending solar absorber fins mounted to the bottom surface of said second pan-shaped absorber and arranged thereon to define a maze-like fluid flow path between the top surface of said first pan-shaped absorber and the bottom surface of said second pan-shaped absorber, one portion of said fluid flow path communicating with a fluid inlet and another portion of said fluid flow path communicating with a fluid outlet, a second plurality of upwardly-extending solar absorber fins mounted to the top surface of said second pan-shaped absorber, and a light-transmissive cover mounted above and supported thereon by said second plurality of upwardly-extending fins to define an insulative dead air space between the top surface of said second pan-shaped absorber and said cover, said second plurality of upwardly-extending absorber fins being located within said insulative dead air space.

12. A roof structure as claimed in claim 11, wherein said fluid medium is air, said air naturally rising from the eaves to the peak of said roof as said air is continually heated as it flows through said successive interconnected solar collector modules.

* * * * *